US011906999B2

(12) United States Patent
Rai et al.

(10) Patent No.: US 11,906,999 B2
(45) Date of Patent: Feb. 20, 2024

(54) VOLTAGE OVERSHOOT DAMPENER IN DROPOUT CONDITION

(71) Applicant: Texas Instruments Incorporated, Dallas, TX (US)

(72) Inventors: Saurabh Rai, Bangalore (IN); Venkateswarlu Ramaswamy Tiruvamattur, Bangalore (IN); Ramakrishna Ankamreddi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 143 days.

(21) Appl. No.: 17/708,350

(22) Filed: Mar. 30, 2022

(65) Prior Publication Data

US 2022/0397927 A1 Dec. 15, 2022

(30) Foreign Application Priority Data

Jun. 10, 2021 (IN) ............................ 202141025777

(51) Int. Cl.
*G05F 1/575* (2006.01)
*G05F 1/565* (2006.01)

(52) U.S. Cl.
CPC ............. *G05F 1/575* (2013.01); *G05F 1/565* (2013.01)

(58) Field of Classification Search
CPC ................................ G05F 1/565; G05F 1/575
See application file for complete search history.

(56) References Cited

U.S. PATENT DOCUMENTS

| | | | | |
|---|---|---|---|---|
| 4,117,345 | A * | 9/1978 | Balcom .................. | G01R 27/20 204/196.36 |
| 6,300,815 | B1 | 10/2001 | Hinterscher et al. | |
| 6,906,404 | B2 | 6/2005 | Maly et al. | |
| 7,474,153 | B1 * | 1/2009 | Dasgupta ............. | H03F 3/3022 330/264 |

(Continued)

FOREIGN PATENT DOCUMENTS

JP 60 163113 A 8/1985

OTHER PUBLICATIONS

1 PCT International Search Report; PCT/US2022/032304; dated Sep. 16, 2022; 4pages.

*Primary Examiner* — Jue Zhang
*Assistant Examiner* — Lakaisha Jackson
(74) *Attorney, Agent, or Firm* — Ray A. King; Frank D. Cimino

(57) ABSTRACT

Described embodiments include a circuit for dampening overshoot in a voltage regulator. The circuit includes a first and second offset voltage circuits, each having an input coupled to an input voltage terminal. A first comparator has a first comparator input coupled to the first offset output, and a second comparator input coupled to a reference voltage terminal. A second comparator has a third comparator input coupled to an output of the second offset circuit, and a fourth comparator input coupled to a voltage regulator output. An OR gate has first and second logic inputs and a logic output. The first and second logic inputs are coupled to the outputs of the first and second comparators, respectively. A turn-off circuit has a turn-off input coupled to the logic output, and is configured to provide a turn-off signal at a turn-off output to stop current flow from the voltage regulator output.

20 Claims, 6 Drawing Sheets

(56) References Cited

U.S. PATENT DOCUMENTS

| | | | | |
|---|---|---|---|---|
| 8,766,612 | B2 * | 7/2014 | Mei | H02M 3/156 323/282 |
| 9,608,537 | B1 | 3/2017 | Lee | |
| 9,785,165 | B2 | 10/2017 | Petenyi et al. | |
| 9,846,445 | B2 | 12/2017 | Pigott et al. | |
| 10,763,747 | B2 | 9/2020 | Turcan | |
| 10,866,607 | B1 | 12/2020 | Avci et al. | |
| 2007/0058437 | A1 * | 3/2007 | Schaffer | G11C 5/143 365/185.23 |
| 2012/0013317 | A1 | 1/2012 | Morino | |
| 2014/0268923 | A1 * | 9/2014 | Valley | H02M 3/33523 363/21.17 |
| 2015/0309518 | A1 * | 10/2015 | Nagda | G05F 1/468 323/274 |
| 2020/0286574 | A1 * | 9/2020 | Kunz | G05F 3/262 |
| 2021/0333814 | A1 | 10/2021 | Breslin | |
| 2023/0187922 | A1 * | 6/2023 | Randazzo | H03K 19/20 361/87 |

* cited by examiner

VOLTAGE OVERSHOOT DAMPENER IN DROPOUT CONDITION

CROSS-REFERENCE TO RELATED APPLICATION

This application claims priority to Indian Patent Application No. 202141025777 filed Jun. 10, 2021, which is incorporated herein by reference.

BACKGROUND

This description relates to voltage regulators and to limiting voltage overshoot on the regulator output voltage following a line transient or brownout while in a dropout condition. Voltage overshoots can occur on the output of a voltage regulator when the input supply voltage of the regulator temporarily drops below a dropout voltage limit due to a fast transient, then recovers. When the regulator recovers from the dropout condition, a large current can rush through the load impedance, causing an overshoot and/or a current limit condition. The dropout voltage of a voltage regulator is the minimum difference between the input voltage and output voltage required to maintain voltage regulation and enable the regulator to provide the specified voltage and current at the output.

A dropout condition occurs when the input voltage drops below the value required by the voltage regulator to maintain its specified voltage and current at the output. A brownout is a temporary dip in the voltage level of the regulator input voltage. When a brownout occurs, the regulator input voltage drops from its normal level to a lower voltage, and then returns to its normal level. When an input supply voltage drops, the regulator feedback loop tries to compensate for the lower input voltage by increasing the gain. When the gain is increased, more current flows through the load in an attempt to raise the output voltage. However, once the input voltage recovers, the bandwidth of the control loop may not be fast enough to lower the gain before the regulator either goes into a current limit condition or else an overshoot occurs on the output voltage. Each of these conditions can cause the voltage regulator to fail to operate within its specifications.

SUMMARY

In a first example, a circuit for dampening overshoot in a voltage regulator includes a first offset voltage circuit having a first offset input and a first offset output. The first offset input is coupled to an input voltage terminal. A second offset voltage circuit has a second offset input and a second offset output. The second offset input is coupled to the input voltage terminal. A first comparator has first and second comparator inputs and a first comparator output. The first comparator input is coupled to the first offset output, and the second comparator input is coupled to a reference voltage terminal. A second comparator has third and fourth comparator inputs and a second comparator output. The third comparator input is coupled to the second offset output, and the fourth comparator input is coupled to a voltage regulator output.

An OR gate has first and second logic inputs and a logic output. The first logic input is coupled to the first comparator output, and the second logic input is coupled to the second comparator output. A turn-off circuit has a turn-off input and a turn-off output. The turn-off input is coupled to the logic output. The turn-off circuit is configured to provide a turn-off signal at the turn-off output to stop current flow from the voltage regulator output in response to a logic high at the turn-off input.

In a second example, a voltage regulator circuit includes a reference generation circuit that has a reference input and a reference output. The reference input is coupled to an input voltage terminal. A first amplifier has first and second amplifier inputs and a first amplifier output. The first amplifier input is coupled to the reference output, and the second amplifier input is coupled to an output voltage terminal. A second amplifier has a third amplifier input and a second amplifier output. The third amplifier input is coupled to the first amplifier output.

A first transistor is coupled between the input voltage terminal and the first amplifier output, and has a first control terminal. A second transistor is coupled between the input voltage terminal and the output voltage terminal, and has a second control terminal that is coupled to the second amplifier output. A first offset voltage circuit has a first offset input and a first offset output. The first offset input is coupled to the input voltage terminal. A second offset voltage circuit has a second offset input and a second offset output, the second offset input is coupled to the input voltage terminal.

A first comparator has first and second comparator inputs and a first comparator output. The first comparator input is coupled to the first offset output, and the second comparator input is coupled to the reference output. A second comparator has third and fourth comparator inputs and a second comparator output. The third comparator input is coupled to the second offset output, and the fourth comparator input is coupled to the output voltage terminal. An OR gate has first and second logic inputs and a logic output. The first logic input is coupled to the first comparator output, and the second logic input is coupled to the second comparator output. A turn-off circuit has a turn-off input and a turn-off output. The turn-off input is coupled to the logic output, and the turn-off circuit is configured to provide a turn-off signal at the first control terminal in response to a logic high at the turn-off input.

In a third example, a method for dampening overshoot in a voltage regulator includes supplying an input voltage to a voltage regulator input and enabling a voltage regulator output. A reference voltage is generated at a reference voltage output. An output voltage at the voltage regulator output is regulated by comparing the reference voltage to a feedback voltage that is proportional to the output voltage.

A first offset voltage is compared to a difference between the input voltage and the output voltage. A second offset voltage is compared to a difference between the input voltage and the reference voltage. The voltage regulator output is disabled responsive to either the first offset voltage being greater than the difference between the input voltage and the output voltage, or the second offset voltage being greater than the difference between the input voltage and the reference voltage.

DETAILED DESCRIPTION

In this description, the same reference numbers depict same or similar (by function and/or structure) features. The drawings are not necessarily drawn to scale.

Figure 1:
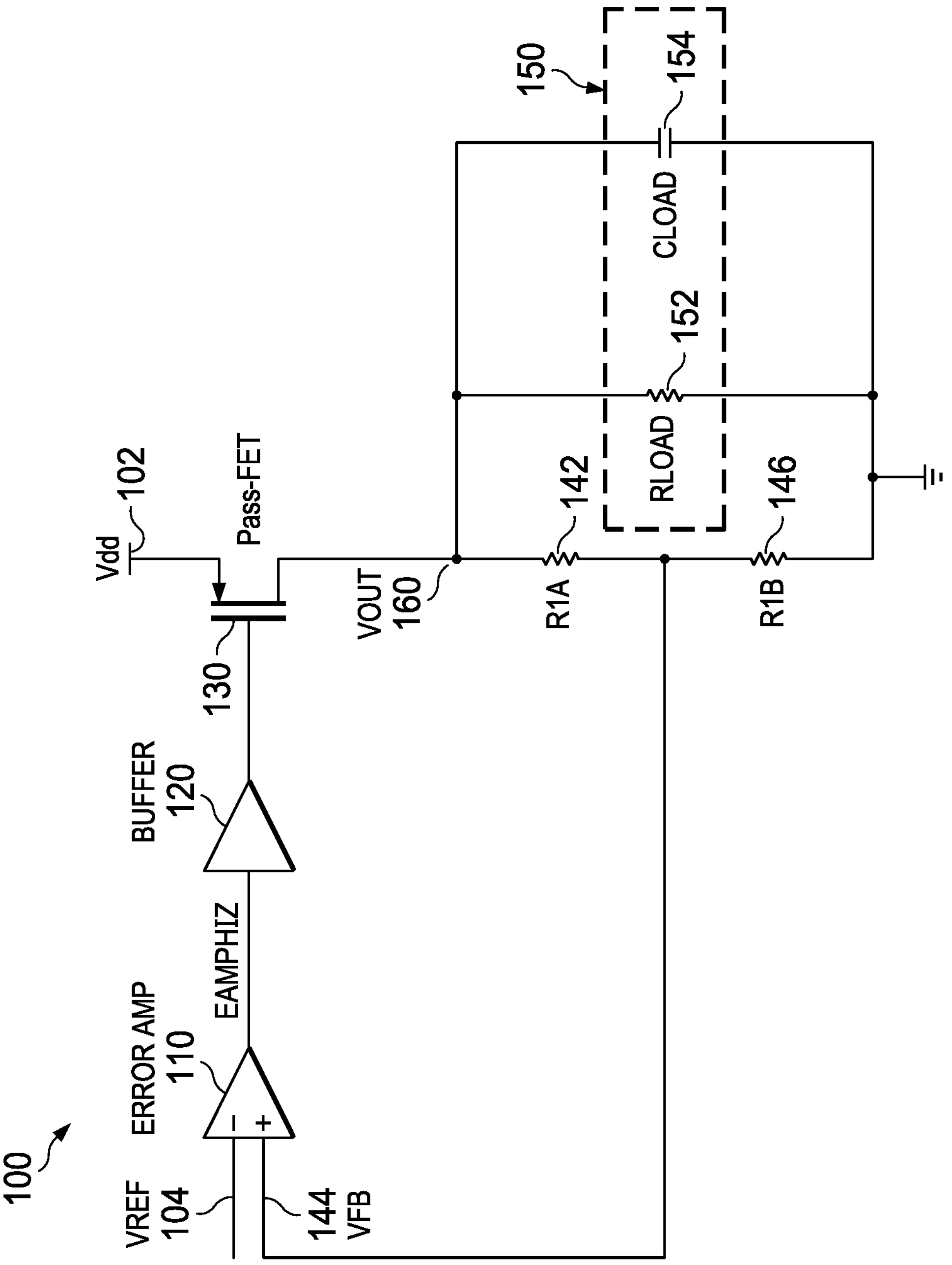
FIG. 1 shows a schematic diagram of an example voltage regulator.

FIG. 1 shows a schematic diagram for an example voltage regulator 100. The input for voltage regulator 100 is $V_{DD}$ 102. The output for voltage regulator 100 is $V_{OUT}$ 160. Resistors 142 and 146 are coupled in series between $V_{OUT}$ 160 and ground, and divide the voltage at $V_{OUT}$ 160 to provide a feedback voltage signal for voltage regulation. The feedback voltage terminal $V_{FB}$ 144 is coupled to a first input of error amplifier 110. A second input of error amplifier 110 is coupled to a reference voltage circuit $V_{REF}$ 104.

The output of error amplifier 110 is coupled to the input of buffer amplifier 120. The output of buffer amplifier 120 is coupled to the gate of transistor 130. The source of transistor 130 is coupled to $V_{DD}$ 102. The drain of transistor 130 is coupled to $V_{OUT}$ 160, the output of voltage regulator 100. The load 150 includes resistor 152 and capacitor 154 coupled in parallel between $V_{OUT}$ 160 and ground.

Resistors 142 and 146 form a voltage divider for output voltage $V_{OUT}$ 160, providing a feedback voltage $V_{FB}$ 144. $V_{FB}$ 144 is compared to a reference voltage $V_{REF}$ 104 using amplifier 110. The voltage of $V_{REF}$ 104 is selected to be equal to the voltage of $V_{FB}$ 144 when $V_{OUT}$ 160 is at a specified voltage. The output EAMPHIZ of amplifier 110 indicates whether the output voltage $V_{OUT}$ 160 is higher or lower than the specified voltage. The input of buffer amplifier 120 is coupled to the output of amplifier 110. The output of buffer amplifier 120 is coupled to the gate of transistor 130. If the voltage at $V_{OUT}$ 160 is below a specified value, the output of buffer amp 120 will be low, increasing the gate-to-source voltage ($V_{GS}$) of transistor 130. If the voltage at $V_{OUT}$ 160 is above the specified value, the $V_{GS}$ of transistor 130 will decrease. Decreasing the $V_{GS}$ of transistor 130 reduces the current through resistor 152, thereby decreasing the voltage at $V_{OUT}$ 160.

If a current demand from load 150 is higher than the current that transistor 130 can provide, the voltage at $V_{OUT}$ 160 may begin to drop. As the voltage at $V_{OUT}$ 160 drops, the output of error amplifier 110, EAMPHIZ, is driven to ground, placing error amplifier 110 into saturation. While it is saturated, error amplifier 110 is unable to respond to inputs, and the output EAMPHIZ remains at ground.

Buffer amplifier 120 has a non-inverting input, so the output of buffer amplifier 120 is driven to ground when the input is at ground, which drives the gate of transistor 130 to ground. This creates a large $V_{GS}$ in transistor 130, thereby causing a large current to flow through transistor 130. The large current through load resistance 152 increases the voltage at $V_{OUT}$ 160, which can cause a voltage overshoot at $V_{OUT}$ 160.

A similar problem can occur when the voltage on $V_{DD}$ 102 drops. When the voltage on $V_{DD}$ 102 drops, the voltage at $V_{OUT}$ 160 may drop in response. As the voltage at $V_{OUT}$ 160 drops, the output of error amplifier 110, EAMPHIZ, is driven to ground. With the input to buffer amplifier 120 at ground, the output of buffer amplifier 120 is driven to ground, thereby driving the gate of transistor 130 to ground. Grounding the gate of transistor 130 creates a large $V_{GS}$ in transistor 130, thereby causing a large current to flow through transistor 130 and through load resistance 152.

The large current through load resistance 152 increases the voltage at $V_{OUT}$ 160, resulting in a voltage overshoot at $V_{OUT}$ 160. So, a drop in the voltage on $V_{DD}$ 102 can drive the voltage regulator into a dropout condition. When the voltage on $V_{DD}$ 102 recovers, a high current will flow through transistor 130 due to the large $V_{GS}$. The large current through transistor 130 can produce a voltage overshoot $V_{OUT}$ 160 as a result of the high current through the load resistance 152.

A second problem may occur in some regulators that generate reference voltage $V_{REF}$ 104 off-chip. In some ultra-low noise architectures, the reference is externally generated off-chip to allow the use of a large external capacitor to filter out noise on the reference voltage signal. The reference voltage is generated by a reference current $I_{REF}$ flowing through a reference resistance having a filter capacitor in parallel with it. The magnitude of the reference current $I_{REF}$ is in the microamp range, whereas the current through transistor 130 can be in a range from hundreds of milliamps to amps. Because of this large difference between the current through transistor 130 and the $I_{REF}$ current, there can be a large difference between the size of the body diode in transistor 130 and the size of the body diode in the $I_{REF}$ transistor.

$V_{OUT}$ 160 will discharge quickly if $V_{DD}$ 102 drops. In at least one case, $V_{OUT}$ 160 is directly connected to an input of error amplifier 110. If $V_{DD}$ 102 drops below $V_{OUT}$, then $V_{OUT}$ will drop to $V_{DD}$ minus the voltage drop across transistor 130. $V_{REF}$ will settle at a voltage lower than $V_{DD}$ 102, but it will drop more slowly than $V_{OUT}$ because the $I_{REF}$ transistor has a smaller body diode than transistor 130, so it will take longer for $V_{REF}$ to discharge to lower than $V_{DD}$. Error amplifier 110 is then forced into a dropout condition, driving EAMPHIZ close to ground. So, the gate of transistor 130 is at a voltage near ground, while the source of transistor 130 is high. The large $V_{GS}$ produces a large current through transistor 130, which causes a voltage overshoot on $V_{OUT}$ 160.

Figure 2:
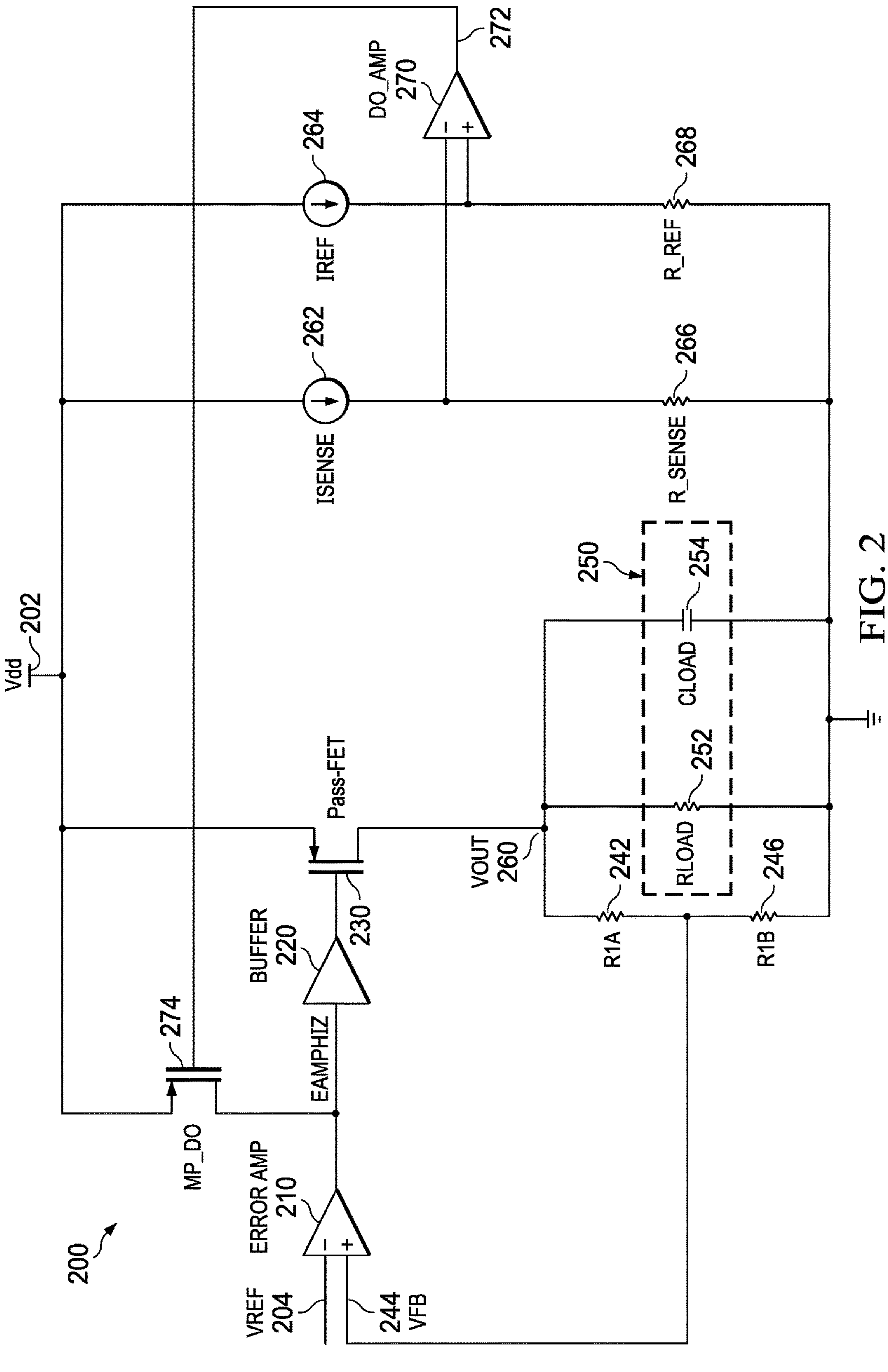
FIG. 2 shows a schematic diagram of an example voltage regulator with a current limit.

FIG. 2 shows a schematic diagram for an example voltage regulator 200 with a current limit. The current limit circuit of voltage regulator 200 limits the output current during normal operation of the voltage regulator as well as when the voltage regulator is in a dropout condition.

The input for voltage regulator 200 is $V_{DD}$ 202. The output for voltage regulator 200 is $V_{OUT}$ 260. Resistors 242 and 246 are coupled in series between $V_{OUT}$ 260 and ground, and form a voltage divider on the voltage at $V_{OUT}$ 260 to provide feedback for voltage regulation. The feedback voltage terminal $V_{FB}$ 244 is coupled to a first input of error amplifier 210. A second input of error amplifier 210 is coupled to a reference voltage terminal $V_{REF}$ 204.

The output of error amplifier 210 is coupled to the input of buffer amplifier 220. The output of buffer amplifier 220 is coupled to the gate of transistor 230. The source of transistor 230 is coupled to $V_{DD}$ 202. The drain of transistor 230 is coupled to $V_{OUT}$ 260, the output of voltage regulator 200. The load 250 includes resistor 252 and capacitor 254 coupled in parallel between $V_{OUT}$ 260 and ground.

Resistors 242 and 246 form a voltage divider for output voltage $V_{OUT}$ 260, that provides a feedback voltage $V_{FB}$ 244. $V_{FB}$ 244 is compared to a reference voltage $V_{REF}$ 204 using error amplifier 210. The value of $V_{REF}$ 204 is selected to be equal to the value of $V_{FB}$ 244 when $V_{OUT}$ 260 is at a specified voltage. The output of amplifier 210 indicates whether the output voltage $V_{OUT}$ 260 is higher or lower than the specified voltage. The output of buffer amplifier 220 drives the gate of transistor 230 in response to the output of amplifier 210. If the voltage at $V_{OUT}$ 260 needs to increase, the $V_{GS}$ of transistor 230 will increase. If the voltage at $V_{OUT}$ 260 needs to decrease, the $V_{GS}$ of transistor 230 will decrease. Decreasing the $V_{GS}$ of transistor 230 reduces the current through resistor 252, decreasing the voltage at $V_{OUT}$ 260.

A first current source ISENSE 262 is coupled between $V_{DD}$ 202 and a first terminal of resistor 266. A second current source $I_{REF}$ 264 is coupled between $V_{DD}$ 202 and a first terminal of resistor 268. The second terminals of resistors 266 and 268 are coupled to ground. Amplifier 270 has a first terminal coupled to resistor 266, and a second terminal coupled to resistor 268. The output of amplifier 270 is coupled to the gate of transistor 274. Transistor 274 is coupled between $V_{DD}$ 202 and the input of buffer amplifier 220.

Current source ISENSE 262 provides a current through resistor 266. The voltage drop across resistor 266 is proportional to the current through transistor 230, and is a first input to amplifier 270. Current source ISENSE 264 sources a current through resistor 268. The voltage drop across resistor 268 is proportional to a current limit threshold value, and is a second input to amplifier 270. The output of amplifier 270 is a signal proportional to the difference between the current through transistor 230 and the current limit threshold.

If the current through transistor 230 exceeds the current limit threshold, the output of amplifier 270 pulls down the gate of transistor 274, which pulls up the input to buffer amplifier 220. The output of buffer amplifier 220 going low drives the gate of transistor 230 high, turning off transistor 230.

Conversely, if the voltage at $V_{DD}$ 202 drops below the dropout voltage, the voltage at $V_{OUT}$ 260 will drop, and voltage regulator 200 will go into a dropout condition. When a dropout condition occurs, error amplifier 210 will be driven to ground, thereby driving the gate of transistor 230 to ground. When the voltage at $V_{DD}$ 202 recovers, a large current flows through transistor 230, and the current limit circuit will become active to reduce the current through transistor 230.

The current limit circuit of voltage regulator 200 may reduce the overshoot problem, but it is not a complete solution to the overshoot problem. The overshoot problem is made worse if the voltage drop at $V_{DD}$ 202 is fast, which can occur with a fast transient or a brownout condition, due to the bandwidth limitation of the circuit. The current limit control loop is not able to react to a line voltage transient that is faster than the bandwidth of the loop, resulting in saturation of the error amplifier.

Figure 3:
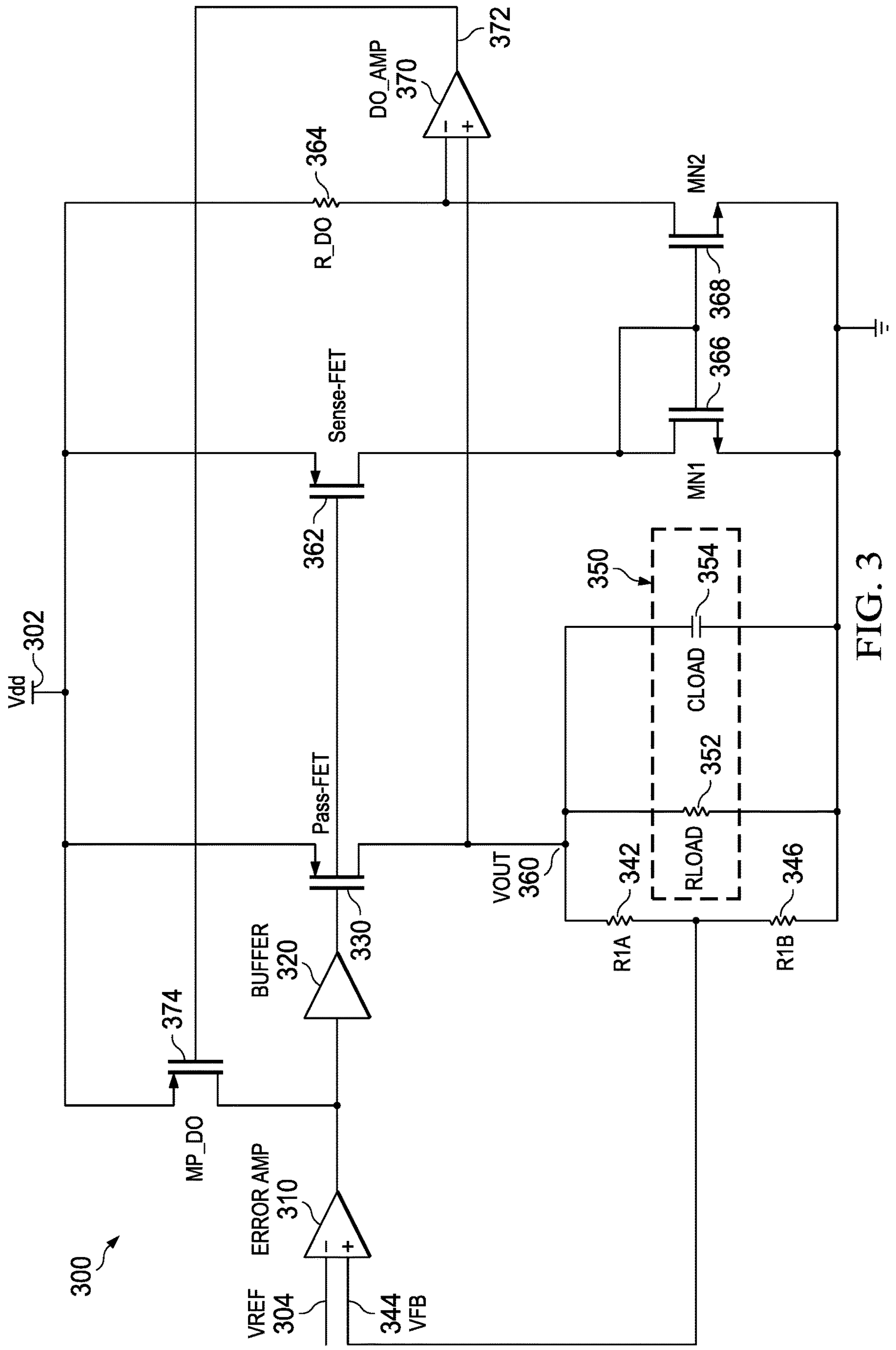
FIG. 3 shows a schematic diagram of an example voltage regulator with a dropout voltage sensing circuit.

FIG. 3 shows a schematic diagram for a voltage regulator 300 with a dropout voltage sensing circuit. The dropout voltage sensing circuit of voltage regulator 300 operates in a similar manner to the current limit loop of voltage regulator 200. The primary difference between the two circuits is that the dropout voltage sensing circuit compares the voltage difference between $V_{DD}$ and $V_{OUT}$ to a reference voltage instead of comparing a current sensed through a transistor to a reference current.

The input for voltage regulator 300 is $V_{DD}$ 302. The output for voltage regulator 300 is $V_{OUT}$ 360. Resistors 342 and 346 are coupled in series between $V_{OUT}$ 360 and ground, and divide the voltage at $V_{OUT}$ 360 to provide a feedback voltage for voltage regulation. The feedback voltage terminal $V_{FB}$ 344 is coupled to a first input of error amplifier 310. A second input of error amplifier 310 is coupled to a reference voltage terminal $V_{REF}$ 304.

The output of error amplifier 310 is coupled to the input of buffer amplifier 320. The output of buffer amplifier 320 is coupled to the gate of transistor 330. The source of transistor 330 is coupled to $V_{DD}$ 302. The drain of transistor 330 is coupled to $V_{OUT}$ 360, the output of voltage regulator 300. The load 350 includes resistor 352 and capacitor 354 coupled in parallel between $V_{OUT}$ 360 and ground.

Resistors 342 and 346 form a voltage divider for output voltage $V_{OUT}$ 360 that provides a feedback voltage $V_{FB}$ 344. $V_{FB}$ 344 is compared to a reference voltage $V_{REF}$ 304 using comparator 310. The value of $V_{REF}$ 304 is selected to be equal to the value of $V_{FB}$ 344 when $V_{OUT}$ 360 is at a specified voltage. The output of error amplifier 310 indicates whether the output voltage $V_{OUT}$ 360 is higher or lower than the specified voltage. The output of buffer amplifier 320 drives the gate of transistor 330 responsive to the output of error amplifier 310. If the voltage at $V_{OUT}$ 360 needs to increase, the $V_{GS}$ of transistor 330 will increase. If the voltage at $V_{OUT}$ 360 needs to decrease, the $V_{GS}$ of transistor 330 will decrease. Decreasing the $V_{GS}$ of transistor 330 reduces the current through resistor 352, decreasing the voltage at $V_{OUT}$ 360.

Transistors 362 and 366 are coupled in series between $V_{DD}$ 302 and ground. Transistor 362 is a p-channel field effect transistor (PFET) with a source that is coupled to $V_{DD}$ 302, and a gate that is coupled to the output of buffer amplifier 320 and the gate of transistor 330. Transistor 366 is an n-channel field effect transistor (NFET) with a drain coupled to the drain of transistor 362, and a source coupled to ground. Transistor 368 is an NFET having a source coupled to ground, and having a gate coupled to the gate and the drain of transistor 366.

Resistor 364 is coupled between the drain of transistor 368 and $V_{DD}$ 302. Comparator 370 has a first input coupled to the drain of transistor 368, and has a second input coupled to $V_{OUT}$ 360. The output 372 of comparator 370 is coupled to the gate of transistor 374, and provides a signal proportional to the difference between the voltage at $V_{OUT}$ 360 and the voltage at the drain of transistor 368. Transistor 374 is coupled between $V_{DD}$ 302 and the input to buffer amplifier 320.

Transistor 362 senses the current through transistor 330, which is the current provided to the load 350. The voltage drop across resistor 364 is a reference dropout voltage, which is a function of the load current. The voltage drop across resistor 364 is compared to a voltage drop across transistor 330, which is the voltage difference between $V_{DD}$ 302 and $V_{OUT}$ 360. If the voltage difference between $V_{DD}$ 302 and $V_{OUT}$ 360 is less than the reference voltage, the output 372 of comparator 370 will turn on transistor 374, pulling up the input to buffer amplifier 320.

The voltage at the gate of transistor 330 is increased when the input to buffer amplifier 320 is pulled up, reducing the $V_{GS}$ of transistor 330, and thus limiting the current through transistor 330. Because the current is being limited, the voltage difference between $V_{DD}$ 302 and $V_{OUT}$ 360 will remain higher than the reference value. However, if there is a very fast line transient, the circuit may fail to maintain voltage regulation due to a limitation of the circuit bandwidth. If the bandwidth of the circuit is exceeded by the line transient, the circuit may not prevent a voltage dropout on $V_{OUT}$ 360.

Figure 4:
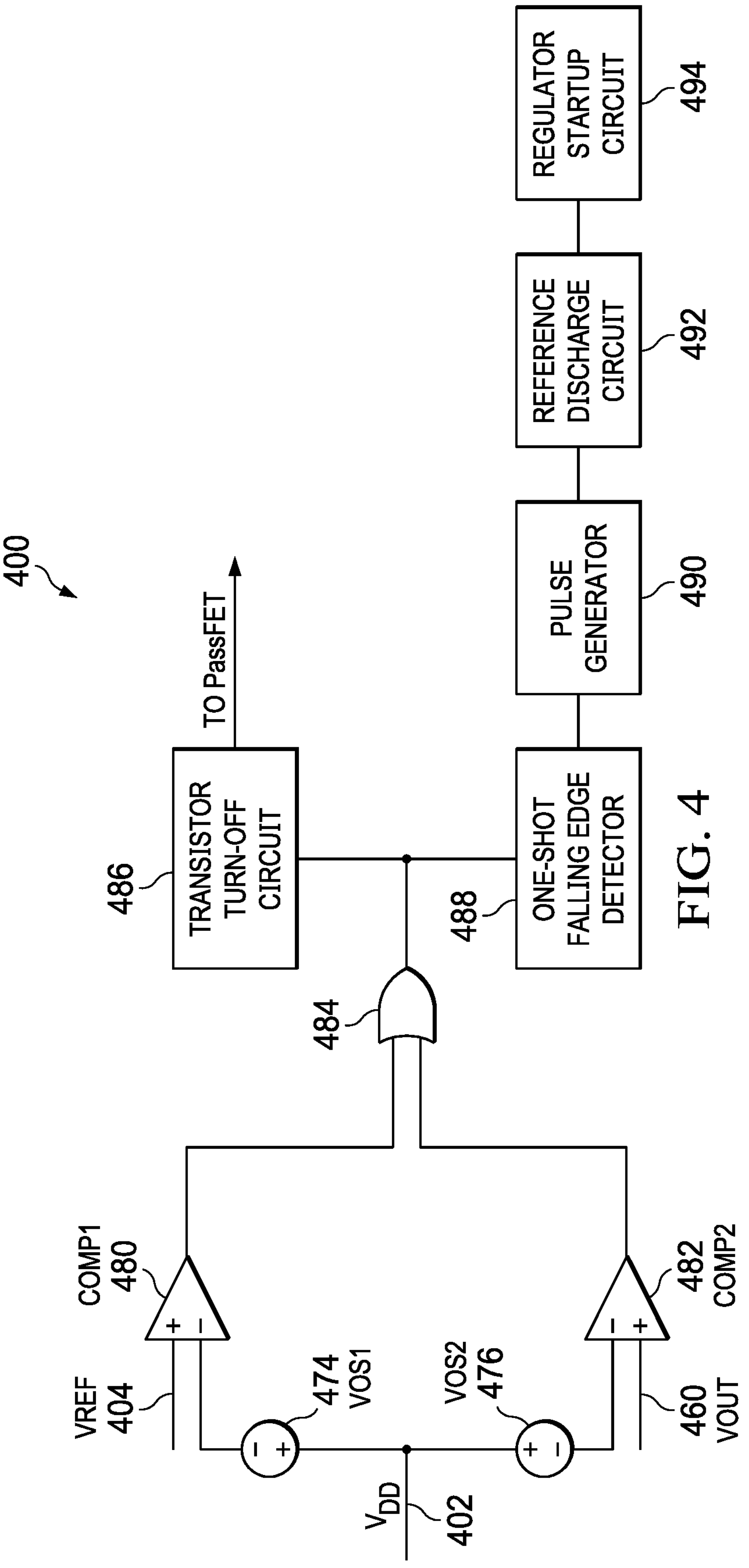
FIG. 4 shows a block diagram for an example comparator-based overshoot dampening circuit in a voltage regulator.

FIG. 4 shows a block diagram for an example comparator-based overshoot dampening circuit 400 in a voltage regulator. The overshoot dampening circuit 400 utilize two comparators that continually monitor for two respective fault conditions in place of current and voltage feedback loops. The outputs of the two comparators are logically OR'd together, allowing the circuit to respond appropriately if either of the fault conditions is detected. The first comparator compares $V_{DD}$ to a reference dropout voltage, and the second comparator compares $V_{DD}$ to $V_{OUT}$.

A first offset voltage circuit $V_{OS1}$ 474 has an input coupled to $V_{DD}$ 402 and an output coupled to a first input of comparator 1 480. A second input of comparator 1 480 is coupled to a reference voltage terminal 404. A second offset voltage circuit $V_{OS2}$ 476 has an input coupled to $V_{DD}$ 402 and an output coupled to a first input of comparator 2 482. A second input of comparator 2 482 is coupled to an output voltage terminal $V_{OUT}$ 460. The output of comparator 1 480 is coupled to a first input of OR gate 484. The output of comparator 2 482 is coupled to a second input of OR gate 484.

The output of OR gate 484 is coupled to an input of transistor turn-off circuit 486. An output of transistor turn-off circuit 486 is coupled to the control terminal of the regulator pass transistor (e.g. 230). When the output of OR gate 484 goes high, the output of the transistor turn-off circuit 486 goes high causing the regulator pass transistor to turn off. The output of OR gate 484 is also coupled to the input of a one-shot falling edge detector 488. After the output of OR gate 484 has gone high, the one-shot falling edge detector 488 monitors the output of OR gate 484 for a falling edge. A falling edge on the output of OR gate 484 indicates that the fault conditions that caused it to go high have ceased. In response to detecting a falling edge on the output of OR gate 484, an output of the one-shot falling edge detector 488 provides a signal to the pulse generator circuit 490. The pulse generator circuit 490 sends a pulse to the input of reference discharge circuit 492 triggering a discharge of the reference voltage. When the reference voltage is discharged, a signal is sent to the regulator startup circuit 494 which initiates a reset and restart of the voltage regulator.

A first offset voltage $V_{OS1}$ 474 is added to $V_{DD}$ 402, and the sum is provided as a first input to comparator 1 480. Comparator 1 480 compares the sum of $V_{DD}$ 402 plus $V_{OS1}$ 474 to a reference voltage $V_{REF}$ 404 and provides a high signal at the output of comparator 1 if the reference voltage $V_{REF}$ 404 is larger than the sum of $V_{DD}$ 402 and $V_{OS1}$ 474.

A second offset voltage $V_{OS2}$ 476 is added to $V_{DD}$ 402, and the sum is provided as a first input to comparator 2 482. Comparator 2 482 compares $V_{DD}$ 402 plus $V_{OS2}$ 476 to the output voltage $V_{OUT}$ 460, and provides a high signal at the output of comparator 2 if $V_{OUT}$ 460 is larger than the sum of $V_{DD}$ 402 and $V_{OS2}$ 476.

Comparator 1 480 and comparator 2 482 each have an offset voltage added to $V_{DD}$ 402 as a first input, but the two offset voltages are different. $V_{OS1}$ 474 is a lower voltage than $V_{OS2}$ 476 to avoid impacting the operation of the circuit during normal operating conditions. The output of comparator 1 480 will be high if $V_{DD}-V_{REF}$ is less than $V_{OS1}$. The output of comparator 2 482 will be high if $V_{DD}-V_{OUT}$ is less than $V_{OS2}$. The outputs of comparator 1 480 and comparator 2 482 are coupled to the inputs of OR gate 484. If the output of either comparator 1 480 or comparator 2 482 is high, the output of OR gate 484 will be high.

Comparator 1 480 can detect a problem that sometimes occurs when the reference voltage $V_{REF}$ 404 is filtered by a large capacitor and the voltage at $V_{DD}$ 402 drops. In this case, the reference voltage $V_{REF}$ 404 will not be completely pulled down to the value of $V_{DD}$ 402 due to the residual charge on the capacitor, and reference voltage $V_{REF}$ 404 will remain higher than $V_{DD}$ 402. In this situation, $V_{DD}$ 402 is at a higher voltage than $V_{OUT}$ 460. So, when the voltage at $V_{DD}$ 402 recovers, the voltage regulator may go into a dropout condition. Comparator 1 480 monitors the voltage difference between $V_{DD}$ 402 and $V_{REF}$ 404. If the voltage at $V_{DD}$ 402 drops and $V_{DD}-V_{REF}$ is less than $V_{OS1}$, the output of comparator 1 will go high.

The comparator 2 circuit serves a similar function to conventional dropout current limiting circuits by detecting and reporting a condition that indicates an overcurrent situation. The advantage that the comparator 2 circuit provides is that comparator 2 482 is, in many cases, quicker to react to the condition than conventional dropout limiting circuits because it operates as an open loop circuit, not as a feedback circuit. In many conventional circuits, if $V_{DD}-V_{OUT}$ is higher than a dropout limit, VDO, the dropout circuitry reduces the $V_{GS}$ across the pass transistor, which reduces the current through the pass transistor. A similar result occurs with circuit 400, but the pass transistor is instead turned off, stopping the flow of current through the pass transistor. If $V_{DD}$ $V_{OUT}$ is higher than $V_{OS2}$ 476, the output of OR gate 484 goes high, which triggers the transistor turn-off circuit to provide a high signal to the control terminal of the pass transistor, turning the pass transistor off.

If $V_{DD}-V_{REF}$ is less than $V_{OS1}$, the output of comparator 1 480 will be high. The output of comparator 2 remains low as long as $V_{DD}$ $V_{OUT}$ is more than $V_{OS2}$. A voltage change in $V_{REF}$ may lag a voltage change in $V_{DD}$ by a delay due to the residual charge on the capacitor filtering $V_{REF}$. However, the voltage at $V_{OUT}$ follows the voltage at $V_{DD}$ with no delay. If the output of comparator 1 falls low, the output of OR gate 484 goes low, causing the output of transistor turn-off circuit 486 to go low. This turns on the pass transistor, allowing $V_{DD}$ to recover to its nominal voltage.

Without the inclusion of the one-shot falling edge detector circuit 488, pulse generator 490 and the reference discharge circuit 492 in the circuit, a dropout followed by an overshoot could occur due to the lag between $V_{REF}$ and $V_{DD}$. The one-shot falling edge detector circuit 488 detects the falling edge of the OR gate output and signals the pulse generator 490 that a falling edge occurred. The pulse generator 490 provides a pulse to the input of reference discharge circuit 492 triggering a discharge of the reference voltage. When the reference voltage is discharged, a signal is sent to the regulator startup circuit 494 which initiates a restart of the voltage regulator, thereby avoiding an overshoot condition.

Figure 5:
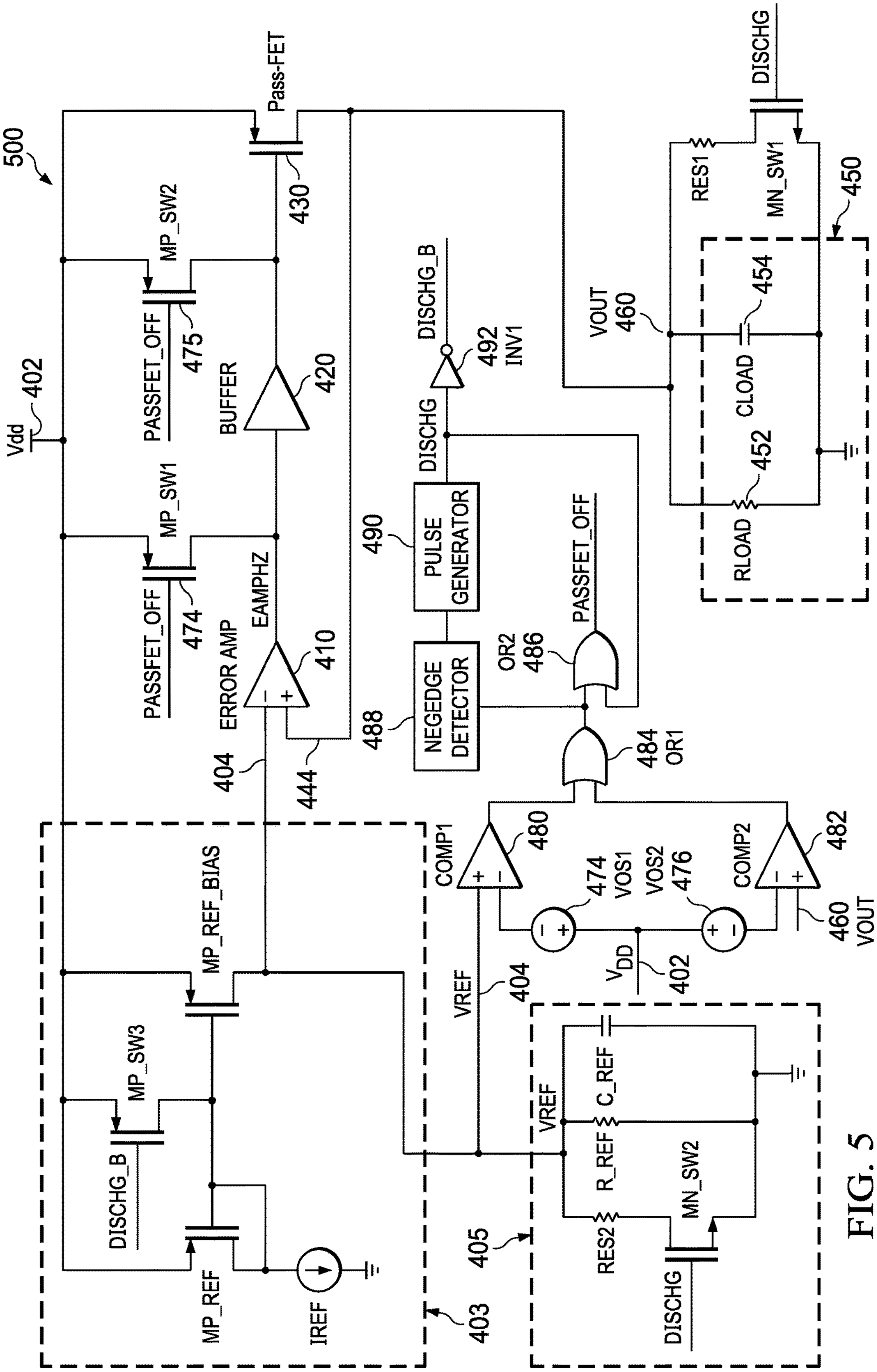
FIG. 5 shows a schematic diagram for an example comparator-based overshoot dampening circuit in a voltage regulator.

FIG. 5 shows a schematic diagram 500 for an example comparator-based overshoot dampening circuit in a voltage regulator. The input voltage for the voltage regulator is $V_{DD}$ 402. The output voltage for the voltage regulator is $V_{OUT}$ 460. A feedback voltage terminal 444 is coupled to a first input of error amplifier 410. Voltage reference generator circuit 403 provides a reference voltage at its output that is compared with a feedback voltage from the voltage regulator. Voltage reference generator circuit 403 has an input coupled to $V_{DD}$ 402 and an output coupled to the reference voltage terminal $V_{REF}$ 404. Reference voltage filter circuit 405 is coupled between the reference voltage terminal $V_{REF}$ 404 and ground. Reference voltage filter circuit 405 filters noise from the reference voltage signal. A first input of error amplifier 410 is coupled to the reference voltage terminal $V_{REF}$ 404. A feedback voltage terminal 444 is coupled to a second input of error amplifier 410.

The output of error amplifier 410 is coupled to the input of buffer amplifier 420. The output of buffer amplifier 420 is coupled to the gate of pass transistor 430. The source of pass transistor 430 is coupled to $V_{DD}$ 402. The drain of pass transistor 430 is coupled to $V_{OUT}$ 460. The load 450 includes resistor 452 and capacitor 454 coupled in parallel between $V_{OUT}$ 460 and ground.

A first offset voltage circuit $V_{OS1}$ 474 has an input coupled to $V_{DD}$ 402 and an output coupled to a first input of comparator 1 480. A second input of comparator 1 480 is coupled to a reference voltage terminal $V_{REF}$ 404. A second offset voltage circuit $V_{OS2}$ 476 has an input coupled to $V_{DD}$ 402 and an output coupled to a first input of comparator 2 482. A second input of comparator 2 482 is coupled to the output voltage terminal $V_{OUT}$ 460. The output of comparator 1 480 is coupled to a first input of OR gate 484. The output of comparator 2 482 is coupled to a second input of OR gate 484.

The output of OR gate 484 is coupled to an input of transistor turn-off circuit 486. In one example, transistor turn-off circuit 486 includes an OR gate. An output, PASS-FET_OFF, of transistor turn-off circuit 486 is coupled to the control terminals of transistors 474 and 475. Transistors 474 and 475 provide first and second levels of turn-off for pass transistor 430, but either transistor 474 or transistor 475 may be omitted in some example circuits.

When the output of OR gate 484 goes high, the output of the transistor turn-off circuit 486 goes high, which turns off pass transistor 430. The output of OR gate 484 is also coupled to the input of one-shot falling edge detector 488. In response to the output of OR gate 484 going high, the one-shot falling edge detector 488 continuously monitors the output of OR gate 484 for a falling edge. A falling edge on the output of OR gate 484 indicates that the fault conditions that caused it to go high have ceased. In response to detecting a falling edge on the output of OR gate 484, an output of the one-shot falling edge detector 488 provides a signal to the pulse generator circuit 490. The pulse generator circuit 490 is coupled to the input of reference discharge circuit 492, and sends a signal triggering a discharge of the reference voltage. The reference discharge circuit 492 is coupled to an input of the regulator startup circuit 494, and sends a signal to the regulator startup circuit 494 that initiates a reset and restart of the voltage regulator.

A first offset voltage $V_{OS1}$ 474 is added to $V_{DD}$ 402, and the sum is provided as a first input to comparator 1 480. Comparator 1 480 compares $V_{DD}$ 402 plus $V_{OS1}$ 474 to a reference voltage $V_{REF}$ 404, and provides a high signal at the output of comparator 1 if the reference voltage $V_{REF}$ 404 is larger than the sum of $V_{DD}$ 402 and $V_{OS1}$ 474.

A second offset voltage $V_{OS2}$ 476 is added to $V_{DD}$ 402, and the sum is provided as a first input to comparator 2 482. Comparator 2 482 compares $V_{DD}$ 402 plus $V_{OS2}$ 476 to the output voltage $V_{OUT}$ 460, and provides a high signal at the output of comparator 2 if $V_{OUT}$ 460 is larger than the sum of $V_{DD}$ 402 and $V_{OS2}$ 476.

Comparator 1 480 and comparator 2 482 each have an offset voltage added to $V_{DD}$ 402 as a first input, but the two offset voltages are different. $V_{OS1}$ 474 is a lower voltage than $V_{OS2}$ 476 to avoid impacting the operation of the circuit during normal operating conditions. The output of comparator 1 480 will be high if $V_{DD}-V_{REF}$ is less than $V_{OS1}$. The output of comparator 2 482 will be high if $V_{DD}$ $V_{OUT}$ is less than $V_{OS2}$. The outputs of comparator 1 480 and comparator 2 482 are coupled to the inputs of OR gate 484. If the output of either comparator 1 480 or comparator 2 482 is high, the output of OR gate 484 will be high.

Comparator 1 480 can detect a problem that sometimes occurs when the reference voltage $V_{REF}$ 404 is filtered by a large capacitor and the voltage at $V_{DD}$ 402 drops. The reference voltage $V_{REF}$ 404 will not be completely pulled down to the value of $V_{DD}$ 402 due to the residual charge on the capacitor, and reference voltage $V_{REF}$ 404 remains higher than $V_{DD}$ 402. In this situation, $V_{DD}$ 402 is at a higher voltage than $V_{OUT}$ 460. So, when the voltage at $V_{DD}$ 402 recovers, the voltage regulator can go into a dropout condition. Comparator 1 480 monitors the voltage difference between $V_{DD}$ 402 and $V_{REF}$ 404. If the voltage at $V_{DD}$ 402 drops and $V_{DD}-V_{REF}$ becomes less than $V_{OS1}$, the output of comparator 1 will go high. If $V_{DD}$ $V_{OUT}$ is higher than $V_{OS2}$ 476, the output of OR gate 484 goes high, which triggers the transistor turn-off circuit to provide a high signal to the control terminal of the pass transistor, turning the pass transistor off.

If $V_{DD}-V_{REF}$ is less than $V_{OS1}$, the output of comparator 1 480 will be high. The output of comparator 2 remains low as long as $V_{DD}$ $V_{OUT}$ is more than $V_{OS2}$. A voltage change in $V_{REF}$ may lag a voltage change in $V_{DD}$ by a delay due to the residual charge on the capacitor filtering $V_{REF}$. However, the voltage at $V_{OUT}$ follows the voltage at $V_{DD}$ with no delay. If the output of comparator 1 falls low, the output of OR gate 484 goes low, causing the output of transistor turn-off circuit 486 to go low. This turns on the pass transistor, allowing $V_{DD}$ to recover to its nominal voltage.

Figure 6:
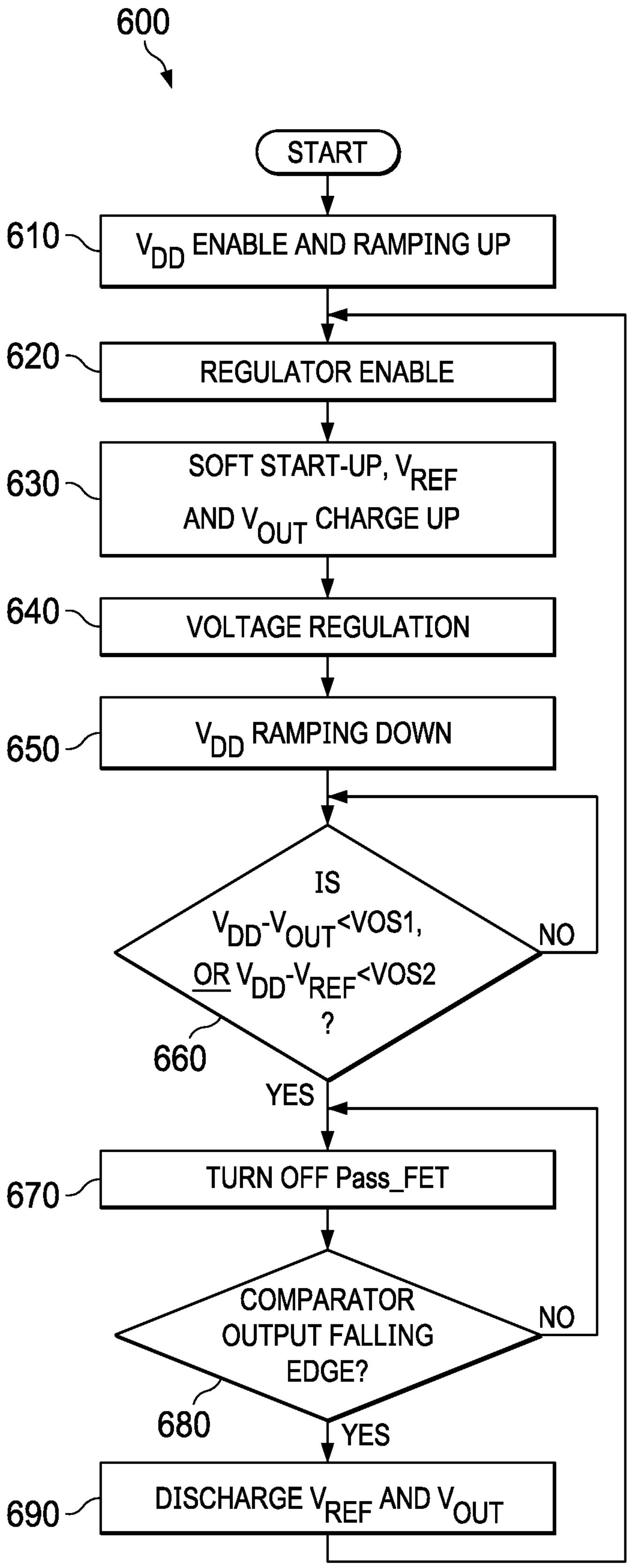
FIG. 6 shows a flow chart of an example method for implementing a comparator-based overshoot dampening circuit in a voltage regulator.

FIG. 6 shows a flow chart 600 of an example method for implementing a comparator-based overshoot dampening circuit in a voltage regulator. In step 610, the power source for the voltage regulator circuit $V_{DD}$ is enabled and its voltage ramps up to a specified value. In step 620, the voltage regulator is enabled and power from $V_{DD}$ is applied as an input to the regulator. In step 630, a reference voltage generation circuit receives power from $V_{DD}$ and begins charging up to its specified value. A reference voltage $V_{REF}$ is provided at a reference voltage terminal internal to the voltage regulator. A regulated output voltage $V_{OUT}$ ramps up to its specified value and is available at the output voltage terminal. Step 640 is normal operation of the voltage regulator in which the regulator input voltage $V_{DD}$ and the regulator output voltage $V_{OUT}$ remain within specified limits.

In step 650, the regulator input voltage $V_{DD}$ begins to drop due to an unspecified cause. In response to the regulator input voltage $V_{DD}$ falling below a specified value, a check is performed in step 660 for either of two conditions that can cause a circuit failure. If either $V_{DD}-V_{OUT}<V_{OS1}$ or $V_{DD}-V_{REF}<V_{OS2}$ are true, the process moves to step 670. Each of the two relationships can be checked using a respective comparator, and the outputs of the two comparators logically OR'd together so that either of the two statements being true will trigger a true output of the OR gate. If both equations are false, then the voltage regulator remains in step 660 and continues to check for either of the two conditions.

In step 670, the pass transistor is turned off to stop the current flow through the load. The output of the OR gate is continuously monitored in step 680 for a falling edge. The pass transistor will remain off as long as a falling edge is not detected in step 680. In response to a falling edge being detected in step 680, the reference voltage $V_{REF}$ and the output voltage $V_{OUT}$ are each discharged in step 690. The voltage regulator is then reset/restarted and the process returns to step 620.

In this description, "terminal," "node," "interconnection," "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A circuit for dampening overshoot in a voltage regulator, the circuit comprising:

a first offset voltage circuit having a first offset input and a first offset output, the first offset input coupled to an input voltage terminal;

a second offset voltage circuit having a second offset input and a second offset output, the second offset input coupled to the input voltage terminal;

a first comparator having first and second comparator inputs and a first comparator output, the first comparator input coupled to the first offset output, and the second comparator input coupled to a reference voltage terminal;

a second comparator having third and fourth comparator inputs and a second comparator output, the third comparator input coupled to the second offset output, and the fourth comparator input coupled to a voltage regulator output;

an OR gate having first and second logic inputs and a logic output, the first logic input coupled to the first comparator output, and the second logic input coupled to the second comparator output; and a turn-off circuit having a turn-off input and a turn-off output, the turn-off input coupled to the logic output, and the turn-off circuit configured to provide a turn-off signal at the turn-off output to stop current flow from the voltage regulator output responsive to a logic high at the turn-off input.

2. The circuit of claim 1, further comprising a falling edge detection circuit having a falling edge circuit input and a falling edge circuit output, the falling edge circuit input coupled to the logic output, and the falling edge detection circuit configured to provide a falling edge signal at the falling edge circuit output in response to a falling edge of a signal at the falling edge circuit input.

3. The circuit of claim 2, further comprising a pulse generation circuit having a pulse circuit input and a pulse circuit output, the pulse circuit input coupled to the falling edge circuit output, and the pulse generation circuit configured to provide a pulse signal at the pulse circuit output in response to the falling edge signal.

4. The circuit of claim 3, further comprising:

a reference discharge circuit having a reference discharge input and a reference discharge output, the reference discharge input coupled to the pulse circuit output, and the reference discharge circuit is configured to provide a discharge signal at the reference discharge output in response to the pulse signal; and a startup circuit having a startup input and a startup output, the startup input coupled to the pulse circuit output, and the startup circuit configured to provide a startup signal at the startup output in response to a pulse signal at the startup input.

5. The circuit of claim 4, wherein the startup signal is configured to trigger a restart of the voltage regulator.

6. The circuit of claim 4, wherein a voltage at the second comparator input is brought to ground in response to the discharge signal.

7. The circuit of claim 2, wherein the falling edge circuit output is coupled to a control terminal of a transistor.

8. The circuit of claim 1, wherein a voltage at the first offset output is lower than a voltage at the second offset output.

9. The circuit of claim 1, wherein the reference voltage terminal is coupled to a bandgap reference circuit.

10. A voltage regulator circuit, comprising:

a reference generation circuit having a reference input and a reference output, the reference input coupled to an input voltage terminal;

a first amplifier having first and second amplifier inputs and a first amplifier output, the first amplifier input coupled to the reference output, and the second amplifier input coupled to an output voltage terminal;

a second amplifier having a third amplifier input and a second amplifier output, the third amplifier input coupled to the first amplifier output;

a first transistor coupled between the input voltage terminal and the first amplifier output, and having a first control terminal;

a second transistor coupled between the input voltage terminal and the output voltage terminal, and having a second control terminal coupled to the second amplifier output;

a first offset voltage circuit having a first offset input and a first offset output, the first offset input coupled to the input voltage terminal;

a second offset voltage circuit having a second offset input and a second offset output, the second offset input coupled to the input voltage terminal;

a first comparator having first and second comparator inputs and a first comparator output, the first comparator input coupled to the first offset output, and the second comparator input coupled to the reference output;

a second comparator having third and fourth comparator inputs and a second comparator output, the third comparator input coupled to the second offset output, and the fourth comparator input coupled to the output voltage terminal;

an OR gate having first and second logic inputs and a logic output, the first logic input coupled to the first comparator output, and the second logic input coupled to the second comparator output; and a turn-off circuit having a turn-off input and a turn-off output, the turn-off input coupled to the logic output, and the turn-off circuit configured to provide a turn-off signal at the first control terminal in response to a logic high at the turn-off input.

11. The voltage regulator circuit of claim 10, wherein the reference generation circuit includes a filter coupled between the reference output and a ground terminal.

12. The voltage regulator circuit of claim 10, further comprising a falling edge detection circuit having a falling edge circuit input and a falling edge circuit output, the falling edge circuit input coupled to the logic output, and the falling edge detection circuit configured to provide a falling edge signal at the falling edge circuit output in response to a falling edge of a signal at the falling edge circuit input.

13. The voltage regulator circuit of claim 12, further comprising a pulse generation circuit having a pulse circuit input and a pulse circuit output, the pulse circuit input coupled to the falling edge circuit output, and the pulse generation circuit configured to provide a pulse signal at the pulse circuit output in response to the falling edge signal.

14. The voltage regulator circuit of claim 13, further comprising:

a reference discharge circuit having a reference discharge input and a reference discharge output, the reference discharge input coupled to the pulse circuit output, the reference discharge output coupled to the reference generation circuit, and the reference discharge circuit is configured to provide a discharge signal at the reference discharge output in response to the pulse signal; and a startup circuit having a startup input and a startup output, the startup input coupled to the pulse circuit output, and the startup circuit configured to provide a startup signal at the startup output in response to a pulse signal at the startup input.

15. The voltage regulator circuit of claim 14, wherein the startup signal is configured to trigger a restart of the voltage regulator circuit.

16. The voltage regulator circuit of claim 14, wherein a voltage at the reference output is brought to ground in response to the discharge signal.

17. The voltage regulator circuit of claim 10, wherein a voltage at the first offset output is lower than a voltage at the second offset output.

18. The voltage regulator circuit of claim 10, wherein the reference generation circuit includes a bandgap reference circuit.

19. A method for dampening overshoot in a voltage regulator, the method comprising:

supplying an input voltage to a voltage regulator input and enabling a voltage regulator output;

generating a reference voltage at a reference voltage output;

regulating an output voltage at the voltage regulator output by comparing the reference voltage to a feedback voltage proportional to the output voltage;

comparing a first offset voltage to a difference between the input voltage and the output voltage, and comparing a second offset voltage to a difference between the input voltage and the reference voltage; and disabling the voltage regulator output responsive to either the first offset voltage being greater than the difference between the input voltage and the output voltage, or the second offset voltage being greater than the difference between the input voltage and the reference voltage.

20. The method of claim 19, further comprising:

discharging the output voltage and the reference voltage in response to the first offset voltage no longer being greater than the difference between the input voltage and the output voltage, and the second offset voltage no longer being greater than the difference between the input voltage and the reference voltage.

* * * * *